(12) United States Patent
Frenier et al.

(10) Patent No.: US 7,192,908 B2
(45) Date of Patent: *Mar. 20, 2007

(54) COMPOSITION AND METHOD FOR TREATING A SUBTERRANEAN FORMATION

(75) Inventors: Wayne Frenier, Katy, TX (US); Murtaza Ziauddin, Richmond, TX (US); Stephen Davies, Sugar Land, TX (US); Frank Chang, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 264 days.

This patent is subject to a terminal disclaimer.

(21) Appl. No.: 10/249,573

(22) Filed: Apr. 21, 2003

(65) Prior Publication Data

US 2004/0254079 A1    Dec. 16, 2004

(51) Int. Cl.
*C09K 8/52* (2006.01)
*E21B 21/00* (2006.01)
*E21B 43/27* (2006.01)

(52) U.S. Cl. .............. 507/241; 507/260; 507/273; 507/277; 507/933; 166/300; 166/307

(58) Field of Classification Search .......... 507/241, 507/236, 237, 244, 260, 267, 273
See application file for complete search history.

(56) References Cited

U.S. PATENT DOCUMENTS

| | | | | |
|---|---|---|---|---|
| 3,951,827 A * | 4/1976 | Burroughs et al. | ......... | 507/241 |
| 4,090,563 A | 5/1978 | Lybarger et al. | ............ | 166/307 |
| 6,436,880 B1 | 8/2002 | Frenier | ....................... | 507/244 |
| 6,506,711 B1 * | 1/2003 | Shuchart et al. | ............ | 507/267 |
| 6,521,028 B1 | 2/2003 | Frenier | ................... | 106/14.42 |
| 6,531,427 B1 | 3/2003 | Shuchart et al. | ............ | 507/267 |
| 6,806,236 B2 * | 10/2004 | Frenier et al. | .............. | 507/241 |
| 2002/0070022 A1 | 6/2002 | Chang et al. | ............ | 166/305.1 |
| 2002/0104657 A1 | 8/2002 | Frenier et al. | .............. | 166/307 |
| 2002/0170715 A1 | 11/2002 | Frenier | ....................... | 166/307 |

FOREIGN PATENT DOCUMENTS

| | | |
|---|---|---|
| EP | 654582 A1 * | 5/1995 |
| WO | 00/70186 | 11/2000 |
| WO | 03/029613 | 4/2003 |

OTHER PUBLICATIONS

10/248,540—*Propped Fracture with High Effective Surface Area* by Chan et al.
SPE 13563—*A Buffer-Regulated HF Acid for Sandstone Acidizing to 550° F* by R.F. Scheuerman.
SPE 74678—*Acid Removal of Scale and Fines at High Temperatures* by T. Huang, P.M. McElfresh and A.D. Gabrysch.
SPE25161—*Removal of Mineral from Reservoir Core by Scale Dissolver* by J.S. Rhudy.
SPE 11188—*EDTA Removes Formation Damage at Prudhoe Bay* by C.M. Shaughnessy and W.E. Kline.
SPE 63242—*Use of Highly Acid-Soluble Chelating Agents in Well Stimulation Services* by Wayne W. Frenier and David Wilson.

* cited by examiner

*Primary Examiner*—Randy Gulakowski
*Assistant Examiner*—Timothy J. Kugel
(74) *Attorney, Agent, or Firm*—David Cate; Tim Curington; Robin Nava

(57) ABSTRACT

An aqueous oilfield treatment fluid containing a chelating agent and an HF source is described. This fluid is effective at dissolving siliceous materials such as clays and keeping the dissolved materials in solution. In particular it is effective at preventing re-precipitation of initially-dissolved silicon as silica and therefore reduces damage to sandstones with which it is contacted. Methods are given for using this fluid for sandstone matrix stimulation, removal of clay-containing drilling fluid components and filter cakes from wellbores, sandstone acid fracturing, and gravel pack and proppant pack cleaning.

10 Claims, 3 Drawing Sheets

COMPOSITION AND METHOD FOR TREATING A SUBTERRANEAN FORMATION

BACKGROUND OF INVENTION

The invention relates to a composition and method for treating a subterranean formation to increase its permeability. More particularly, the invention relates to a stimulation composition and method in which secondary reactions resulting in precipitation of initially dissolved materials are reduced.

The present invention relates to methods to enhance the productivity of hydrocarbon producing wells (e.g., oil wells) by creating alternate flow paths by removing portions of a wellbore coating, dissolving small portions of the formation, or removing (by dissolution) near-wellbore formation damage. Generally speaking, acids or acid-based fluids are useful for this purpose due to their ability to dissolve both formation minerals and contaminants (e.g., drilling fluid components coating the wellbore or that have penetrated the formation) which were introduced into the wellbore/formation during drilling or remedial operations. In the case of treatments within the formation (rather than wellbore treatments) the portion of the formation that is near the wellbore and that first contacts the acid is adequately treated, though portions of the formation more distal to the wellbore (as one moves radially outward from the wellbore) may remain untouched by the acid, because all of the acid reacts before it can get very far from the wellbore.

For instance, sandstone formations are often treated with a mixture of hydrofluoric and hydrochloric acids (called mud acid), usually at very low injection rates (to avoid fracturing the formation). This acid mixture is often selected because it will dissolve clays (found in drilling mud) as well as the primary constituents of naturally occurring sandstones (e.g., silica, feldspar, and calcareous material). In fact, the dissolution is so rapid that the injected mud acid is essentially spent by the time it reaches a few inches beyond the wellbore. Thus, it can be calculated that, because of reaction, a far greater amount of acid would be required to achieve radial penetration of even a single foot, if a conventional mud acid fluid were used to treat a damaged sandstone at high temperatures, than would be required to fill the pores of a region extending to five feet from the wellbore (assuming 20 percent formation porosity and a 6-inch wellbore diameter). Recent studies on matrix stimulation (treatment below fracture pressure) have strongly emphasized the importance of secondary and tertiary reactions in determining the success of matrix stimulation treatments. These reactions produce solids, such as hydrated silica or gibbsite ($Al(OH)_3$), which can damage the formation during the stimulation process. Sandstone formations frequently contain clays and other minerals made up of aluminosilicates. Fluids containing chelating agents as well as HF-producing chemicals have been proposed for treatment of sandstone formations.

Chelating agents are materials that are employed, among other uses, to control undesirable reactions of metal ions. In oilfield chemical treatments, chelating agents are frequently added to matrix stimulation acids to prevent precipitation of solids (metal control) as the acids spend on the formation being treated. (See Frenier W. W., et al., "Use of Highly Acid-Soluble Chelating Agents in Well Stimulation Services," SPE 63242 (2000).) These precipitates include iron hydroxide and iron sulfide. In addition, chelating agents are used as components in many scale removal/prevention formulations. (See Frenier, W. W., "Novel Scale Removers Are Developed for Dissolving Alkaline Earth Deposits," SPE 65027 (2001).) Two different types of chelating agents are in use: polycarboxylic acids (including aminocarboxylic acids and polyaminopolycarboxylic acids) and phosphonates. Chelating formulations based on ethylenediaminetetraacetic acid (EDTA) have been used extensively to control iron precipitation and to remove scale. Formulations based on nitrilotriacetic acid (NTA) and diethylenetriaminepentaacetic acid (DTPA) also are in use. Hydroxy chelating agents have also been proposed for use in matrix stimulation of carbonates (see Frenier, et al., "Hydroxyaminocarboxylic Acids Produce Superior Formulations for Matrix Stimulation of Carbonates," SPE 68924 (2001)) as well as for use as metal control agents and in scale removal fluids. The materials evaluated include hydroxy-aminopolycarboxylic acids (HACA) such as hydroxyethylethylenediaminetriacetic acid (HEDTA) as well as other types of chelating agents.

Fredd and Fogler (see Fredd, C. N., and H. S. Fogler, "The Influence of Transport and Reaction on Wormhole Formation in Porous Media," J. Am. Inst. Chem. Eng., 44, 1933–1949 (1998); Fredd, C. N., and H. S. Fogler, "The Influence of Chelating Agents on the Kinetics of Calcite Dissolution," J. Col. Interface. Sci., 204, 187–197 (1998); and Fredd, C. N. and Fogler, H. S., "The Kinetics of Calcite Dissolution in Acetic acid Solutions," Chem. Eng. Sci., 22, 3863–3874 (1998)) have proposed a use for EDTA-type chelating agents that employs the chelating agents as the primary dissolution agent in matrix acidizing of carbonate formations (in particular calcite: calcium carbonate; and dolomite: calcium/magnesium carbonate). The purpose of the carbonate matrix acidizing treatment is to remove near wellbore damage and to produce "wormholes" that increase the permeability of the near wellbore region. Because HCl reacts so rapidly with most carbonate surfaces, diverting agents, ball sealers and foams are typically used to direct some of the acid flow away from large channels that may form initially and take all of the subsequent acid volume. By adjusting the flow rate and pH of the fluid, it becomes possible to tailor the slower reacting EDTA solutions to the well conditions and achieve maximum wormhole formation with a minimum amount of solvent. However, acids and methods used for carbonate stimulation are not the same as those used for sandstone stimulation.

Disodium EDTA has been used as a scale-removal agent in the Prudhoe Bay field of Alaska (see Shaughnessy, C. M. and W. E. Kline, "EDTA Removes Formation Damage at Prudhoe Bay," SPE Paper 11188 (1982)). In this case, $CaCO_3$ scale had precipitated in the perforation tunnels and in the near-wellbore region of a sandstone formation. High decline rates followed conventional HCl treatments, but 17 wells treated with disodium EDTA maintained production after these treatments. Rhudy (see Rhudy, J. S., "Removal of Mineral Scale From Reservoir Core by Scale Dissolver," SPE Paper 25161 (1993)) reviewed the use of EDTA and DTPA formulations to remove Ca, Ba and Sr scales from reservoir cores. However, many fluid properties and procedures required for successful scale removal are different from those required for successful sandstone stimulation.

Huang (see Huang, T., et al. "Acid Removal of Scale and Fines at High Temperatures," SPE paper 74678 (2002)) described the acid removal of scale and fines at high temperatures. This fluid (believed to be a mixture of organic acids) was developed to clean fines-plugged screens and/or gravel packs, especially in high-temperature formations. Due to the type of metallurgy, long acid contact times, and high acid sensitivity of the formations, removal of the scale with HCl acids had been largely unsuccessful. A series of tests conducted on screens and clay-rich cores showed that a new organic acid system, which was highly biodegradable, could successfully remove the calcium carbonate scale and fines to stimulate production. They reported that core flood testing demonstrated that this organic acid system could effectively remove calcium carbonate scales and fines at temperatures up to 204° C. (400° F.). Corrosion tests showed that at 177° C. (350° F.), the corrosion rate caused by this organic acid was 0.00049 g/cm$^2$ (0.001 lb/ft$^2$) on 22-Cr for 16 hours. (Also see Ali, A., et al. "Chelating Agent-Based Fluids for Optimal Stimulation of High-Temperature Wells," SPE paper 63242 (2002).) This paper also discusses use of chelating agent formulations for stimulation of sandstones and carbonates at high temperatures.

U.S. Pat. No. 6,436,880 (assigned to Schlumberger Technology Corporation) describes a well treatment fluid composition containing a first acid, in an amount of from about 0.1 weight percent to about 28 weight percent, preferably selected from HCl, HF, formic acid, acetic acid, or mixtures of those acids, and a second acid, in an amount from about 0.5 to about 30 weight percent, that is HEIDA (hydroxyethyliminodiacetic acid) or one of its salts, and/or HEDTA (hydroxyethylethylenediaminetetraacetic acid) or one of its salts. This patent also describes methods of matrix acidizing, and removal of scale and/or drilling mud from wellbores using this fluid composition. U.S. Patent Application Publication No. 2002/0170715 (assigned to Schlumberger Technology Corporation) describes matrix stimulation with a composition containing potassium, lithium or ammonium salts of EDTA (ethylenediaminetetraacetic acid) or DTPA (diethylenetriaminepentaacetic acid). U.S. Patent Application Publication Nos. 2002/0104657 and 2002/0070022 (assigned to Schlumberger Technology Corporation) describe an acidic composition containing fluoboric acid and an acid, or mixture of acids, which chelate aluminum ions and aluminum fluoride species. The fluoboric acid may be made from a fluoride source (such as HF or an HF source such as ammonium fluoride or ammonium bifluoride, optionally plus HCl) and a borate source, such as boric acid. The chelating acids may be polycarboxylic acids (such as citric, tartaric or malic acids) or aminocarboxylic acids such as nitrilotriacetic acid (NTA), HEDTA, HEIDA, or their ammonium or potassium salts. These applications also describe methods of using these acidic compositions for matrix stimulation.

U.S. Pat. No. 4,090,563 describes an "aqueous mud acid solution" containing a weak acid (preferably citric, formic, or acetic acid), a weak acid salt (preferably the ammonium salt of the weak acid), a fluoride salt (preferably ammonium fluoride), and a partial salt of an aminopolyacetic acid chelating agent (preferably EDTA having 2.5 ammonium ions). The partial salt of the aminopolyacetic acid chelating agent can serve as the weak acid salt. The solution was found to be effective for dissolving siliceous materials such as bentonite clay. However, one of the inventors later described adding EDTA having 2.5 ammonium ions to an acetic acid/ammonium hydroxide buffered HF sandstone acidizing fluid to improve the ability of the fluid to hold aluminum and magnesium ions in solution and therefore reduce the amount of reaction-product precipitates, but he reported that not only did this not work relative to the fluid without the chelant, but it resulted in more precipitation of silica as well (R. F. Scheuerman, SPE paper 13563; SPE Production Engineering, pp. 15–21, February (1988)).

U.S. Pat. No. 6,531,427 describes a method of acidizing an aluminum containing sandstone using as an acidizing composition a fluid containing water, HF and at least one hydroxy carboxylic acid (preferably citric, tartaric, malic, lactic or hydroxyacetic acid) present in an amount of from 2.1 weight percent to about 10 weight percent. The method is said to be effective for the prevention of precipitation of aluminum fluoride compounds.

Sandstone matrix "stimulation" is often ineffective and sometimes damaging. The precipitation of silica is thought to be the major reason that sandstone-acidizing jobs fail to produce the anticipated decrease in skin, especially at temperatures >150° F. (66° C.) or in the presence of acid sensitive clay. There is a need for fluids and methods to increase the stimulation ratio (reduce overall skin) by eliminating some of the precipitation reactions. There is a need for fluids and methods that will not damage sandstone formations.

SUMMARY OF INVENTION

A first embodiment of the invention is an aqueous oilfield treatment fluid containing a fluoride source, in an amount that can release from about 0.3 to about 3.3 weight percent fluoride when in contact with acid, and a chelating acid in an amount of from about 10 to about 40 weight percent. The first stability constant of the chelating acid with aluminum ion has a log greater than about 5. The chelating acid is one or more than one of maleic acid, tartaric acid, citric acid, NTA (nitrilotriacetic acid), HEIDA (hydroxyethyliminodiacetic acid), HEDTA (hydroxyethylethylenediaminetetraacetic acid, EDTA (ethylenediaminetetraacetic acid), CyDTA (cyclohexylenediaminetetraacetic acid), DTPA (diethylenetriamine-pentaacetic acid), ammonium, lithium, or sodium salts of those acids, or mixtures of those acids and/or their salts. The chelating acid is preferably diammonium ethylenediaminetetraacetic, present in an amount between about 10 and about 40 weight percent, preferably between about 15 and about 30, most preferably between about 20 and about 25.

In another embodiment, the fluoride source is ammonium bifluoride is present in an amount between about 0.5 and about 6 weight percent, preferably between about 1 and about 5, and most preferably between about 1 and about 2. In yet another embodiment, the fluoride source is ammonium fluoride present in an amount between about 0.3 and about 4 weight percent, preferably between about 0.6 and about 3, most preferably between about 0.6 and about 1.3.

In another embodiment, the pH of the aqueous oilfield treatment fluid is adjusted to between about 3 and about 9, preferably between about 5 and about 7, most preferably between about 5 and about 6.5. The pH is adjusted with a base (selected from among an ammonium salt, ammonium hydroxide, or an amine having the formula R1R2R3N in which R1, R2, and R3 are alkyl groups having from one to about 4 carbon atoms, $CH_2CH_2OH$, or H) or an acid (selected from HCl, formic acid, or acetic acid).

In yet another embodiment, the aqueous oilfield treatment fluid contains boric acid in an amount of between about 1 weight percent and about 6 weight percent, preferably between about 2 weight percent and about 4 weight percent, and most preferably between about 2.5 weight percent and about 3.5 weight percent. In other embodiments the fluid may contain a mutual solvent and/or a surfactant.

Another embodiment of the invention is a method of matrix stimulation of a subterranean sandstone formation that includes injecting the aqueous oilfield treatment fluid of previous embodiments into the formation matrix in an amount sufficient to increase the permeability of the formation. Another embodiment is a method of fracturing a sandstone formation that includes injecting the aqueous oilfield treatment fluid of previous embodiments into the formation matrix at a pressure sufficient to fracture the formation.

Additional embodiments include removal of drilling mud or filter cake, or cleaning gravel packs or hydraulic fracturing proppant packs by injecting the aqueous oilfield treatment fluid of previous embodiments into a wellbore or into the pack.

DETAILED DESCRIPTION

Figure 1:
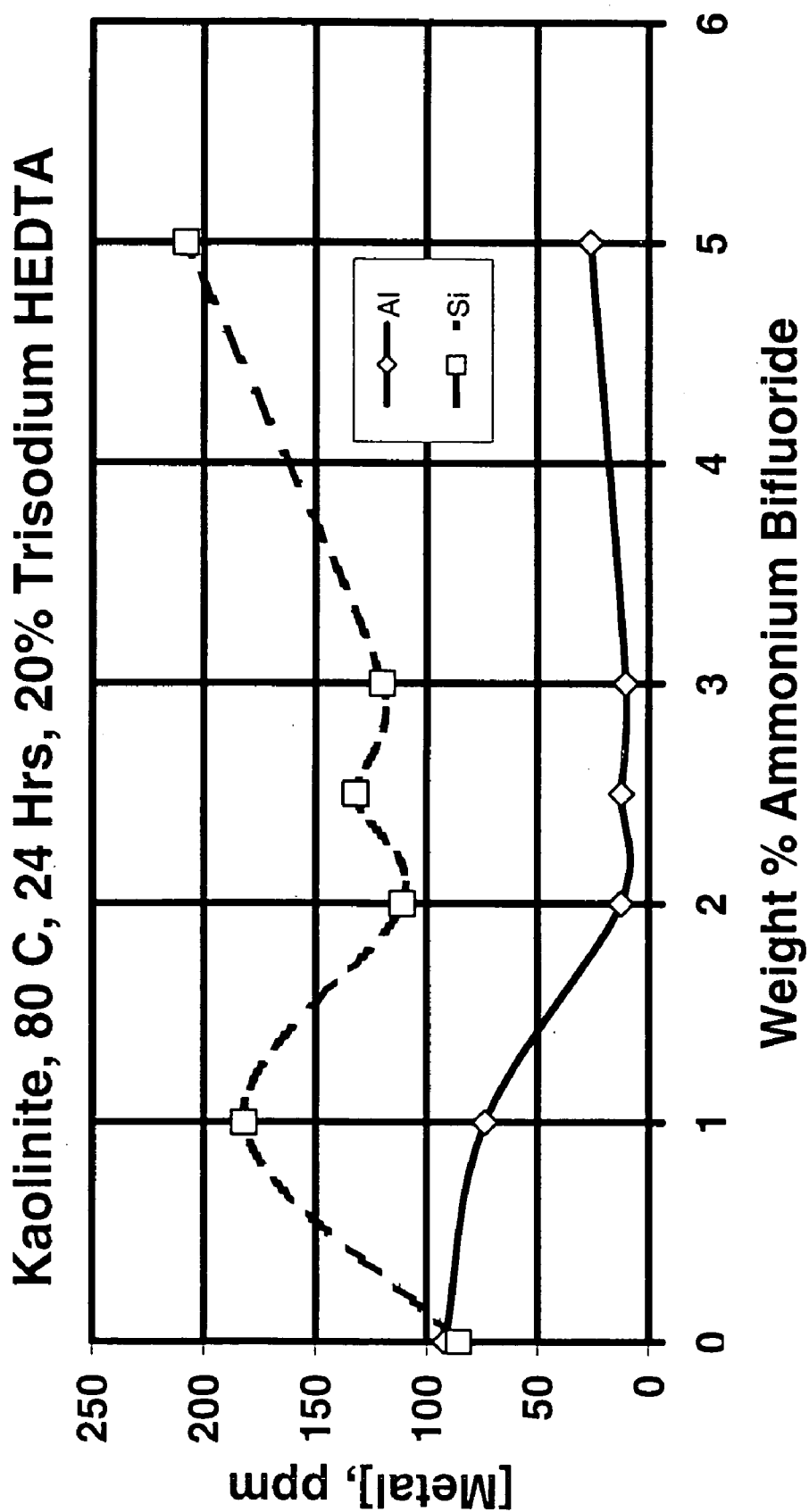
FIG. 1 shows the aluminum and silicon in solution after treatment of kaolinite with trisodium HEDTA and varying amounts of ammonium bifluoride.

We have discovered that the ability of an organic acid type chelating agent to dissolve and to hold various reaction products of aluminosilicates (in particular Al, Si and Mg ion complexes) in solution can be manipulated by simultaneously controlling the relative amount of ammonium ions, the concentration of fluoride ions and the pH of the formulation, each within a specified range. We have identified aqueous treatment fluids having certain preferred salts of certain preferred chelating agents, preferred sources of and concentrations of fluoride ions, and preferred pH's that are particularly effective in processes in which it is desired to dissolve silicon-containing compounds in the presence of aluminum containing compounds and to prevent the subsequent precipitation of silica. We will describe these compositions and there uses primarily in terms of matrix stimulation of sandstones, although it is to be understood that that is only one embodiment of the invention. Embodiments of the invention include particularly a process and composition for dissolving clay and clay-like minerals (i.e. aluminosilicates) from sandstone formations using mixtures of chelating agents capable of stabilizing aluminum in solution between pH values of about 3 and about 9. Ammonium ions are added to control the rate of the dissolution of the clay by HF, especially at higher pH values. The pH and the amount of fluoride added (from about 0.5 to about 5 percent) are manipulated to control the degree of silica or aluminum salt precipitation. The process can be used to stimulate oil and gas-bearing formation while minimizing the precipitation of hydrated silica and other precipitates. Some of the chelating agents also dissolve/control calcium or magnesium salts and their precipitates.

Suitable chelating agents include malic acid, tartaric acid, citric acid, certain aminopolycarboxylate and polyaminopolycarboxylate chelating agents (such as, by non-limiting example, NTA (nitrilotriacetic acid), HEIDA (hydroxyethlimnodiacetic acid), HEDTA (hydroxyethylethylenediaminetetraacetic acid, EDTA (ethylenediaminetetraacetic acid), CyDTA (cyclohexylenediaminetetraacetic acid), DTPA (diethylenetriamine-pentaacetic acid)) and certain aminopolymethylenephosphonic acid chelating agents and some of their salts. The criteria for the selection of the chelating agent ("chelant") are that the log of the stability constant ([Al(III)L]/[Al(III)][L]), where L is the chelating agent, should be greater than about 5, and that the free acid of the chelant should be soluble under the conditions of use. The criteria for the selection of the salt cation are based upon the pH and on what other materials are present. Ammonium is the preferred cation and can be used under any conditions under which the fluid embodiments of the invention would be used in the oilfield. Sodium and lithium may be used at conditions under which their fluorides are soluble. Potassium should not be used because there are potassium-aluminum and potassium-silicon compounds that would precipitate. The chelating acid or its salt is preferably present in an amount between about 10 and about 40 weight percent, more preferably between about 15 and about 30, and most preferably between about 20 and about 25. The process can be conducted from about 150° F. (66° C.) to about 400° F. (198° C.).

Some of the important reactions occurring in sandstone matrix stimulation when the sandstone contains clay, and when ammonium and chelant are present and HF is generated from ammonium bifluoride, are shown below:

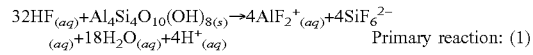
Primary reaction: (1)

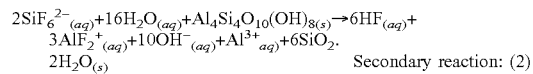
Secondary reaction: (2)

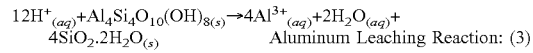
Aluminum Leaching Reaction: (3)

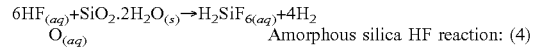
Amorphous silica HF reaction: (4)

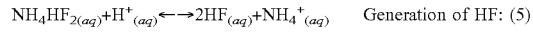
Generation of HF: (5)

Precipitation of Al: (6)

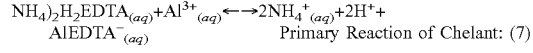
Primary Reaction of Chelant: (7)

Secondary Reaction of Chelant: (8)

A key problem is that initially-dissolved silicon, in the form of $SiF_6^{-2}$ reacts with clays to form solid amorphous silica and aluminum fluorides that may then precipitate. The problem is particularly serious at higher temperatures, above for example about 150° F. (66° C.). Of course, there are many other species present in solution and as solids, and many other reactions taking place, some to completion and some in equilibrium. The actual compositions and amounts of species present depend upon many factors, in particular the fluids and solids initially present, the temperature, and the time. The accuracy with which the actual species present in solution and as solids can be determined (or predicted) depends upon the complexity of the system and the number of reactions taken into consideration. Simple laboratory experiments may be characterized accurately by calculation and/or measurement; real field situations may be approximated to an extent dependent upon how well the initial conditions are known and how complex a model is used. Computer models are invaluable when considering real field situations.

Not to be limited by theory, but it is believed that if the chelating agents have a stability constant greater than about 5, then the aluminum ions in solution (resulting from the primary dissolution reaction of aluminum-containing minerals and compounds) are present primarily in the chelated form. In the absence of an appropriate chelating agent, these aluminum ions would be present in solution primarily as aluminum fluoride salts or would precipitate, for example as $NH_4AlF_4$ if sufficient ammonium were present. Also, in the absence of the chelating agent, gibbsite ($Al(OH)_3$) could precipitate. Since a common form of soluble aluminum fluoride salt is $AlF_2^+$ and a common form of soluble silicon fluoride is $H_2SiF_6$, then the amount of fluoride required to maintain silicon in solution might be three times the amount of fluoride required to maintain aluminum in solution (or one and one half times the amount of fluoride that is lost from the system if the aluminum is precipitated as $NH_4AlF_4$). Of course there are many possible soluble aluminum-containing species, having up to six fluorides per aluminum; there are also many possible aluminum-containing solids, containing up to about four fluorides per aluminum. Note that precipitation of aluminum typically consumes more fluoride than maintaining aluminum in solution. In general, therefore, keeping the most silicon in solution as possible would typically be accomplished by keeping as much aluminum as possible in solution, although that may not always be the case. In the absence of the chelating agent, the aluminum is held in solution primarily by fluoride, or precipitated as a fluoride, and then silicon precipitates because there is insufficient fluoride to hold it in solution. In the presence of the chelating agent, the aluminum is held in solution by the chelating agent and the silicon is held in solution by the fluoride. The precipitation of an aluminum fluoride salt removes one aluminum and four fluorides from the solution. Stabilization of a silicon in solution requires six fluorides. In the presence of an appropriate chelating agent, such as EDTA, aluminum is complexed by both EDTA and one fluoride, allowing more fluoride to be available to stabilize silicon. We have found that by carefully controlling the pH in the presence of the proper chelating agents, and by simultaneously ensuring that the optimal amounts of ammonium and fluoride are available, the effectiveness of sandstone matrix stimulation is optimized. Only a narrow range of concentrations of ammonium and fluoride is effective.

This works only if the pH is between about 3 and about 9. If the pH is too low, then aluminum is not chelated and some chelate acid may precipitate. If the pH is too high, then aluminum or aluminum-calcium salts may precipitate. As is described elsewhere, the optimal pH depends upon the choice of chelant, the choice of cation in the chelant salt, the temperature, and the nature of the cations in the minerals being contacted. However, the preferred pH range is from about 5 to about 7, and the most preferred is from about 5 to about 6.5. The pH may be adjusted by adding acid or base. The preferred acid is HCl, although other acids may be used, such as acetic, formic, citric, malic, and hydroxy acetic acids. The preferred base is ammonium hydroxide, although other bases may be used, such as substituted amines ($R-NH_2$, ethanol amines and substituted ethanol amines ($HO-CH_2CH_4-NH_2$, etc). The fact that these pH's are much higher than mud acids is a distinct advantage, because these sandstone matrix stimulation fluids are much less corrosive than mud acids.

Re-precipitation of initially-dissolved silicon as amorphous silica is responsible for much of the damage observed in sandstone matrix stimulation. Furthermore, re-precipitation of any solids onto minerals that otherwise could be dissolved will slow or stop the dissolution. Therefore, the best treatment would be one in which initially-dissolved aluminum does not remove a lot of fluoride from the solution, so that fluoride remains available to keep silicon in solution. This can be determined by controlling the nature of the species in solution. This, in turn, can be achieved by the proper control of the amounts of ammonium, hydrogen ion (pH), fluoride, and chelant, given the choice of chelant and the nature and amounts of the solids (for example formation silica, formation aluminosilicates, other natural minerals, precipitates resulting from oilfield operations, drilling fluid components, scales, or other materials). Of particular importance is the acid capacity of the system that is the amount of acid consumed by reactions, for example, the amount of carbonate present in a sandstone.

The rate of dissolution is important in sandstone matrix stimulation because it has an effect (as does the amount of dissolution) on the location and nature of dissolution, as is well known in the art. Most important is whether dissolution is localized near the wellbore or extends deep into the formation. Either might be preferred, depending upon the reason for the treatment. The rates (and amounts) of dissolution are, of course, affected by the concentrations of dissolution agents. The dissolution reaction can be slowed, however, without decreasing the ultimate amount of dissolution by retarding the rate of generation of the HF. Although there are physical ways to do this, for example by using the dissolution fluid in the form of an emulsion, one good way is to use boric acid ($H_3BO_3$) which reacts with the HF as it is initially generated from the ammonium bifluoride to form fluoboric acid ($HBF_4$) which then releases HF to the system more slowly. One advantage of using boric acid to slow the reactions is that boric acid may also be useful as a clay control additive to minimize the movement of fines.

In embodiments of the invention, the preferred source of fluoride is ammonium bifluoride, although others sources of fluoride may be used, such as ammonium fluoride and HF. When the fluoride source is ammonium bifluoride, it is present in an amount between about 0.5 and about 6 weight percent, preferably between about 1 and about 5, most preferably between about 1 and about 2. When the fluoride source is ammonium fluoride, it is present in an amount between about 0.3 and about 4 weight percent, preferably between about 0.6 and about 3, and most preferably between about 0.6 and about 1.3.

The sandstone matrix stimulation fluid embodiments may advantageously be formulated with mutual solvents as components. A preferred mutual solvent is dipropylene glycol methyl ether (DPM). Mutual solvents are used to water-wet the formation and to help dissolve small amounts of organic compounds; mutual solvents are preferably included in a concentration of from about 2 to about 10 weight percent. Other suitable mutual solvents include, by non-limiting example, ethyleneglycolmonobutyl ether, propylene glycol and dipropylene glycol substituted on one or both hydroxyls with methyl, acetate, acrylate, ethyl, propyl or butyl.

The sandstone matrix stimulation fluid embodiments may also advantageously be formulated with certain surfactants for the purposes of water wetting the formation, lowering the surface tension and dispersing fines. A typical suitable surfactant is cocamidopropyl betaine. Other suitable surfactants are ammonium $C_6$–$C_{10}$ alcohol ethoxysulfate or alcohols, $C_6$–$C_{10}$ ethoxylated quaternary compounds, and many different types of ammonium quaternary compounds.

Sandstone matrix stimulation fluids typically should contain corrosion inhibitors if their pH's are below about 10. Conventional corrosion inhibitors may be used as long as they are suitable for use with and compatible with organic acids or chelating agents. Compounds containing ammonium quaternary moieties and sulfur compounds are suitable (see for example U.S. Pat. No. 6,521,028). Sandstone matrix stimulation fluid embodiments of the invention may also contain many other additives commonly used in oilfield treatment fluids, such as clay control additives, viscosifiers, wetting agents, emulsifiers, agents to prevent the formation of emulsions, and foaming agents. It is to be understood that whenever any additives are included, laboratory tests should be performed to ensure that the additives do not affect the performance of the fluid.

The solutions of DAE and ammonium bifluoride should be made up so that the pH does not go below 5.5 by adding ammonium hydroxide to DAE, then adding ammonium bifluoride. Ammonium bifluoride can be purchased as a solid or as a solution in water. The fluids also can be formulated from DAE, ammonium hydroxide and liquid HF. Solutions of other chelating acids should be adjusted with appropriate acids, bases, or buffers so that the pH is above the pH at which the free chelating acid would precipitate. Components of the aqueous oilfield treatment fluid embodiments of the invention may be mixed in any order. Any combination of some or all of the components can be pre-mixed in a concentrate and then diluted and/or the remaining component or components, if any, added and then diluted if necessary. Any or all of the mixing steps may be performed in advance of use at a separate location, or at the site of the use. The aqueous oilfield treatment fluid embodiments of the invention may be stored or used immediately after preparation. The only preparation and storage requirements are that the final formulation must be stable and contain no precipitates when used. Chelating acids may be obtained as solids or liquids, free acids or salts, and may be obtained as a solution in water. Any water may be used for preparation of the aqueous oilfield treatment fluid embodiments of the invention, provided only that no salts are present that would result in formation, in preparation or in use, of undesirable precipitates, and that no materials present in the water would interfere with the efficacy of the fluid. Simple laboratory testing to ensure the suitability of the water is within the scope of embodiments of the invention, just as in the case of additives.

In method embodiments of the invention, in addition to sandstone matrix stimulation, these compositions can be used for fracture acidizing of sandstone, drilling mud or filter cake removal, or for proppant pack or gravel pack cleanup, as long as the primary solid to be removed is a clay. In these treatments, they can be used as a pre-flush, as the main fluid, or as a post-flush. The fluids may also be viscosified by incorporation of viscoelastic surfactants, polymers, or polymers with crosslinkers. In viscosified form, in addition to the uses just listed, the fluid embodiments of the invention may be used for hydraulic fracturing, gravel packing, frac-packing, and formation of propped fractures with wormholes as described in U.S. patent application Ser. No. 10/248,540 (filed on Jan. 28, 2003, assigned to Schlumberger Technology Corporation, and hereby incorporated in its entirety). When used in proppant and gravel pack placement or cleanup (of gravel or proppant packs that have been plugged or partially plugged by migrating fines or by precipitates), the fluid embodiments of the invention have an advantage over previously used, more strongly acidic, cleanup fluids because the fluid embodiments of the invention do not cause a loss of crush strength of proppants or gravel. When they are used in pack placement, they allow placement and cleanup in a single step. Viscosification of oilfield treatment fluids is well known in the art and any suitable means may be used. The oilfield treatments discussed here that can be improved by use of fluids that are embodiments of the present invention are known to those skilled in the art, when performed with previously known fluids, except for the methods disclosed in U.S. patent application Ser. No. 10/248,540. Before using fluid embodiments of the invention in improved method embodiments of the invention, one skilled in the art would perform laboratory tests or computer simulations to ensure that the selected fluid would be efficacious in the intended use; such normal precautions are considered to be within the scope of embodiments of the invention.

The well treatment fluid compositions of embodiments of the present invention can be used to remove clay-containing drilling mud and filter cake from the wellbore. Removal of drilling mud and filter cake occurs especially readily if the mud contains carbonates, especially calcium carbonate, but is normally difficult if the deposit contains clays. Removal of drilling mud can be performed by any technique know in the art, and involves the steps of injecting a well treatment fluid composition of the present invention into the wellbore.

The well treatment fluid compositions of embodiments of the present invention can be used in matrix stimulation of subterranean formations surrounding wellbores. Such matrix stimulation (acidizing) methods generally involve pumping the acid-containing well treatment composition down the wellbore and out through perforations into the target formation. Packers can be used in the wellbore to control the formation zones into which the treatment fluid is injected from the wellbore, if the well has perforations in more than one zone. After the composition has been injected into the formation, optionally the well can be shut in for a period of time to allow more complete reaction between the acid and the formation material. The desired result of the treatment is an increase in the permeability of the formation, for example by the creation or enlargement of passageways through the formation, and therefore an increase in the rate of production of formation fluids such as oil and gas.

Parameters such as pumping rate, pumping time, shut-in time, acid content, and additive package, must be determined for each particular treatment since each of these parameters depends upon the extent of the damage, formation geology (e.g., permeability), formation temperature, depth of the producing zone, etc. A well-treatment designer of ordinary skill is familiar with the essential features of matrix acidizing treatments.

One of ordinary skill in the art will recognize that the well treatment compositions of embodiments of the present invention can be used in the fracture acidizing of a formation. By increasing the pumping pressure (to above the minimum in situ rock stress), a matrix acidizing treatment becomes an acid fracturing treatment. Unlike non-acid fracturing treatments, wherein a proppant is highly desired to hold open the fracture after pumping pressure is released, in acid fracturing treatments, the faces of the fractures formed by the high pressure of pumping are etched by the acid to provide a towpath for hydrocarbons to the wellbore after pumping pressure is released.

DAE is also expected to have the additional advantage of being a clay stabilizer itself, because of the high concentration of ammonium ions. With other chelating agents that are embodiments of the invention, it may be necessary to add clay stabilizers such as KCl, $NH_4Cl$, or $(CH_3)_4NCl$; these can be used with DAE as well.

The preferred sequence of injection of fluids in sandstone matrix stimulation (acidizing) when fluoride is in the main treatment fluid is a pre-flush, then an optional brine spacer, then the main treatment fluid, then a post-flush. In a typical treatment in which fluoride is introduced into a wellbore or formation, a pre-flush such as a mutual solvent or toluene, xylene, or the like may be employed, if desired, to clean the wellbore and surrounding formation of organic deposits such as paraffins or asphaltenes. Optionally, the pre-flush to remove organic deposits may be followed by a pre-flush of HCl or an organic acid, especially acetic acid, to dissolve carbonates in the formation and thus to ensure that there is no calcium (from calcium carbonate) remaining in the region. In sandstone, an acid pre-flush is commonly a 5 to 15% HCl solution containing a corrosion inhibitor. It displaces $Na^+$ and $K^+$ as well as dissolves calcite (calcium carbonate). This prevents subsequent precipitation of sodium or potassium fluosilicates or calcium fluoride when HF is introduced, and saves more expensive HF or HF sources. The post-flush (for oil wells a hydrocarbon like diesel, or 15% HCl; for gas wells, acid or a gas like nitrogen or natural gas) also isolates the unreacted HF from brine that may be used to flush the tubing, as well as restores a water-wet condition to the formation and to any precipitates that did form. The sequence of stages may be repeated. The pre-flush and/or post-flush also help to minimize any incompatibilities between treatment fluids and oil. Though the formulations of embodiments of the invention are compatible with small concentration of non-emulsifying agents and are not highly acidic, to prevent emulsion and sludge that may form from contact of crude oil with acid, it is also a good practice to pre-flush or post-flush the well with a mutual solvent, preferably low molecular weight esters, ether and alcohols, and more preferably ethylene glycol monobutyl ether or DPM. Mutual solvent, such as 10% ethylene glycol monobutyl ether, is used as a post-flush to strip any oil wetting surfactant from the surface and leave it water wet. It is also common to over-flush or post-flush with an aqueous solution containing, for example, 5 percent by weight ammonium chloride or 10 percent glacial acetic acid. In many cases, when fluids that are embodiments of the present invention are used, little or no pre-flush or post-flush is needed. If a post-flush is desired, it need be only ammonium chloride. This is because the fluids that are embodiments of the present invention are more compatible with sodium, potassium calcium and crude oil than most other fluoride-containing treatment fluids.

The optimal amount of ammonium bifluoride for a given treatment in which clay is to be dissolved is dictated primarily by the temperature, by the amount of very readily dissolved material, such as $CaCO_3$, present, and by the presence of cations other than those of silicon and aluminum, such as those of sodium, potassium, and calcium, that may form insoluble fluorides under certain conditions. At low temperatures, such as about 200° F. (about 93° C.), large amounts of silicon can be held in solution, but ammonium-aluminum-fluoride salts precipitate. Most fluid embodiments of the invention stimulate sandstones at low temperatures. At higher temperatures, or in the presence of significant amounts of calcium or magnesium-containing carbonates, the amount of ammonium bifluoride used should be less. For example, at 250° F. (121° C.), Berea sandstone cores are stimulated by a fluid containing 20 weight percent active DAE and 3 weight percent ammonium bifluoride, but are damaged by a fluid containing 20 weight percent active DAE and 5 weight percent ammonium bifluoride. At 300° F. (149° C.), more silicon precipitates and less ammonium bifluoride should be used. Not to be limited by theory, but we believe that these effects are due substantially to changes in the complex equilibria in equations (6–8) above, so that aluminum precipitates as ammonium-aluminum-fluoride salts at low temperatures wile leaving excess fluoride available for maintaining a substantial amount of silicon in solution. At higher temperatures, the ammonium is released from the salt and the chelating agent can leach aluminum (from minerals like clays) which also complexes with the chelating agent and fluoride. For example, we believe that about 2 weight percent ammonium bifluoride may be used with DAE up to about 250° F. (121° C.), or with sandstones having up to about 2 weight percent carbonates, but the limit is about 1 weight percent ammonium bifluoride at higher temperatures, or with sandstones having higher carbonate contents. With carbonate contents above about 5 percent, the ammonium bifluoride should be limited to about 0.5 weight percent. Not to be limited by theory, but we believe that the silica produced by too much ammonium bifluoride is more damaging than the aluminum salts that may precipitate at lower temperatures. In most cases, 1 weight percent ammonium bifluoride will be the concentration of choice; in some cases up to 2 weight percent ammonium bifluoride may be chosen; in a few cases it may be possible to use up to about 5 weight percent ammonium bifluoride.

The key attributes of the fluid embodiments of the invention are that compared to other fluids used to dissolve aluminosilicates downhole, the fluids are calcium-tolerant, iron tolerant, insensitive to the types of aluminosilicates present, can be used over a broad temperature range, and are compatible with crude oil. The fluid embodiments of the invention are used in method embodiments of the invention in conventional ways, except that they may require little or no corrosion inhibition additives or clay control additives, and they may require little or no pre-flush or post-flush treatments. The fluids also may not need to be retarded (for example by viscosifying or by formation of emulsions). However, corrosion inhibitors, clay control additives, pre-flushes, post-flushes, and retarding methods may be used within the scope of embodiments of the invention. The fluids of embodiments of the invention can dissolve as much clay as 9:1 mud acid with simultaneous dissolution of large amounts of calcium, and they give minimal dissolution of zeolites and are less damaging to acid-sensitive clays or feldspars than fluids containing HCl or high concentrations of HF. They are also safer for personnel.

Experiments were conducted using the following materials, equipment and procedures:

Mineral Preparation: Five minerals were used: kaolinite $Al_2Si_2O_5(OH)_4$, montmorillonite $Ca_{0.17}Al_{2.3}Si_{3.7}(OH)_2$, analcime $Na_2O.Al_2O_3.4SiO_2.H_2O$, chlorite (Mg(Fe))$_5Al_2Si_3O_{10}(OH)_8$, illite $(K,H)Al_2(Si,Al)_4O_{10}(OH)_2$, and albite $NaAlSi_3O_8$. All of the solvents were prepared from laboratory-grade chemicals. The minerals were crushed in a plastic bag, and then ground to a fine powder using a mortar and pestle.

Slurry Reactor: High clay ratios (about 9/1 by weight of fluid to aluminosilicate) were used. In these tests, there was never enough fluid to completely dissolve the mineral, and so the secondary reactions are particularly important to the final results. The slurry reactor was obtained from Parr Instrument Co., Moline, IL, USA. The test cell is a modified 4500 series Parr pressure reactor, with a nominal capacity of 1 liter of fluid. The reactor was stirred (100 rpm) using a 3-bladed impeller driven by a magnetic drive-coupled electrical motor. The cell also was fitted with a dip tube to remove samples and a backpressure regulator, which was set at 50 psig. The reactor body and wetted internal surfaces were constructed of Hastelloy B metal. All of the connecting lines were 316 stainless steel and the heated transfer flask was constructed of Teflon-coated 316 stainless steel. To conduct each test, approximately 9/1-weight ratio of fluid to clay (e.g., 70 g of weighed clay) was placed in a Teflon liner and then placed in the cell, which was closed and heated to the test temperature (with a small amount of nitrogen pressure). The test fluid (approximately 650 g of weighed liquid) was pumped into the transfer flask, which was also heated to the test temperature. When both chambers were at the test temperature, the test fluid was transferred to the chamber containing the stirred clay (at 100 rpm) and the test time was started. At appropriate intervals, small samples of fluid were withdrawn from the chamber, immediately filtered through a 0.45 micrometer filter, weighed and diluted with 2 percent nitric acid. In all runs, no more than 10 percent of the total liquid volume was withdrawn during the test.

Some preliminary reactions were run with 100 ml of treatment fluid and 2 g of clay in static tests as follows: The samples were placed in an oven at 180° F. (82° C.) for 24 hours. The solution was periodically sampled and the concentrations of silicon and aluminum were determined using Inductively Coupled Plasma Optical Emission Spectrometry (ICPOES).

Preservation of the samples with nitric acid is a critical step for maintenance of the integrity of the original samples" metal concentrations. The samples were analyzed using ICPOES, usually within 24 hours after the test. The concentrations of silicon and aluminum are expressed as mg/kg of fluid based on the weight concentration of the fluid in the test chamber at the time of the sample withdrawal. The pH of the fluid was determined using an HF-resistant pH probe and instrument calibrated in the pH range of 1.0 to 4.0. The final weight of the clay was determined after filtration, washing with DI water and drying for 24 hours at 200° F. (93° C.) for 24 hours.

The treatment chemicals evaluated were "HEDTA" (the term used in the discussion of experimental results for trisodium HEDTA, 40 percent active, adjusted to a pH of about 4.0 with HCl); "DAE" (the term used in the discussion of experimental results for diammonium EDTA, used at several concentrations, usually 50 percent of the commercial product (which is 40 percent active), which gives a 20 percent active solution, having a nominal pH of about 4.5 to about 5.0, but in some tests adjusted to a pH of about 6.5 with ammonia to stabilize ammonium bifluoride in solution); and "CSA" ("Citric Stimulation Acid"; the term used in the discussion of experimental results for a fluid consisting of 13 percent citric acid, 5 percent ammonium bifluoride, 2.5 percent boric acid and HCl to adjust the pH to about 1.5). A few other solvents were used for comparison.

Core flood Tests: Core flood tests were run using Berea sandstone. The Berea cores were treated with several different solvents. A backpressure of 600 psig was used to keep $CO_2$ in solution. The Berea cores were tested at 200, 250, 300 or 350° F. (93, 121, 149, 177 or ° C.) and a constant flow rate of 5 ml/min. The test consisted of two KCl stages (pumped in opposite directions) to establish the initial permeability, followed by 10 or 15 pore volumes of the treating fluid and a final KCl (10 PV) stage (post-flush) to establish the final permeability, and thus the amount of stimulation/damage achieved. Samples were collected at regular intervals and analyzed for Al, Ca and Si by Inductively Coupled Plasma Optical Emission Spectroscopy (IC-POES) for all three stages.

Chemical Analyses: All of the solution analyses, with the exception of soluble fluoride (F) were performed using ICPOES. The fluoride analyses were conducted using fluoride specific ion electrode methods. Many of the aluminosilicates as well as the reaction products were analyzed using powder X-ray diffraction (XRD). Several samples of clay reaction products were analyzed to determine the amount of amorphous silica (not visible by XRD) using solid state $^{29}Si$ NMR.

The Berea sandstone used was determined by powder X-ray diffraction to be 87 percent quartz, 3 percent potassium feldspar, 2 percent calcium-sodium feldspar, 5 percent illite, 2 percent kaolinite, and 1 percent chlorite, with a trace of calcite. It should be understood that there are many sandstones with many mineralogies and the sandstone used in these experiments was undamaged, that is it did not contain any drilling solids, scales, precipitates, fines that had migrated in, or other contaminants.

All compositions are given in weight percent active ingredient. Table 1 shows the ppm silicon and aluminum in solution and the weight percent silicon and aluminum dissolved in kaolinite dissolution experiments at a 9/1 fluid/clay weight ratio in the slurry reactor with various fluids, at various pH"s and temperatures for about 4 hours. Table 2 shows Berea sandstone core flood tests at 350° F. (177° C.) with various fluids. The table gives the initial and final permeabilities in mD; the percent permeability increase; the maximum ("peak") ppm in solution at any point during the experiment and the total mg removed during the experiment for aluminum, calcium and silicon; and the total weight loss in g of the core as a result of the experiment. The initial core weights were typically about 160 g. In Table 2, DPM was present at a concentration of 10 weight percent when listed; SURF is a surfactant formulation containing some light alcohols and a betaine, present at a concentration of 0.5 weight percent when listed. Table 3 shows Berea sandstone core flood tests at various temperatures with 50 weight percent as-received DAE and various other components. It shows the maximum ("peak") ppm in solution at any point during the experiment and the total mg in solution at the end of the experiment for aluminum, calcium and silicon; and the ratio of the final permeability to the initial permeability. Scale Inhibitor A contains diethylene triaminepenta (methylene phosphonic acid) and Scale Inhibitor B contains a proprietary phosphonate blend.

Figure 2:
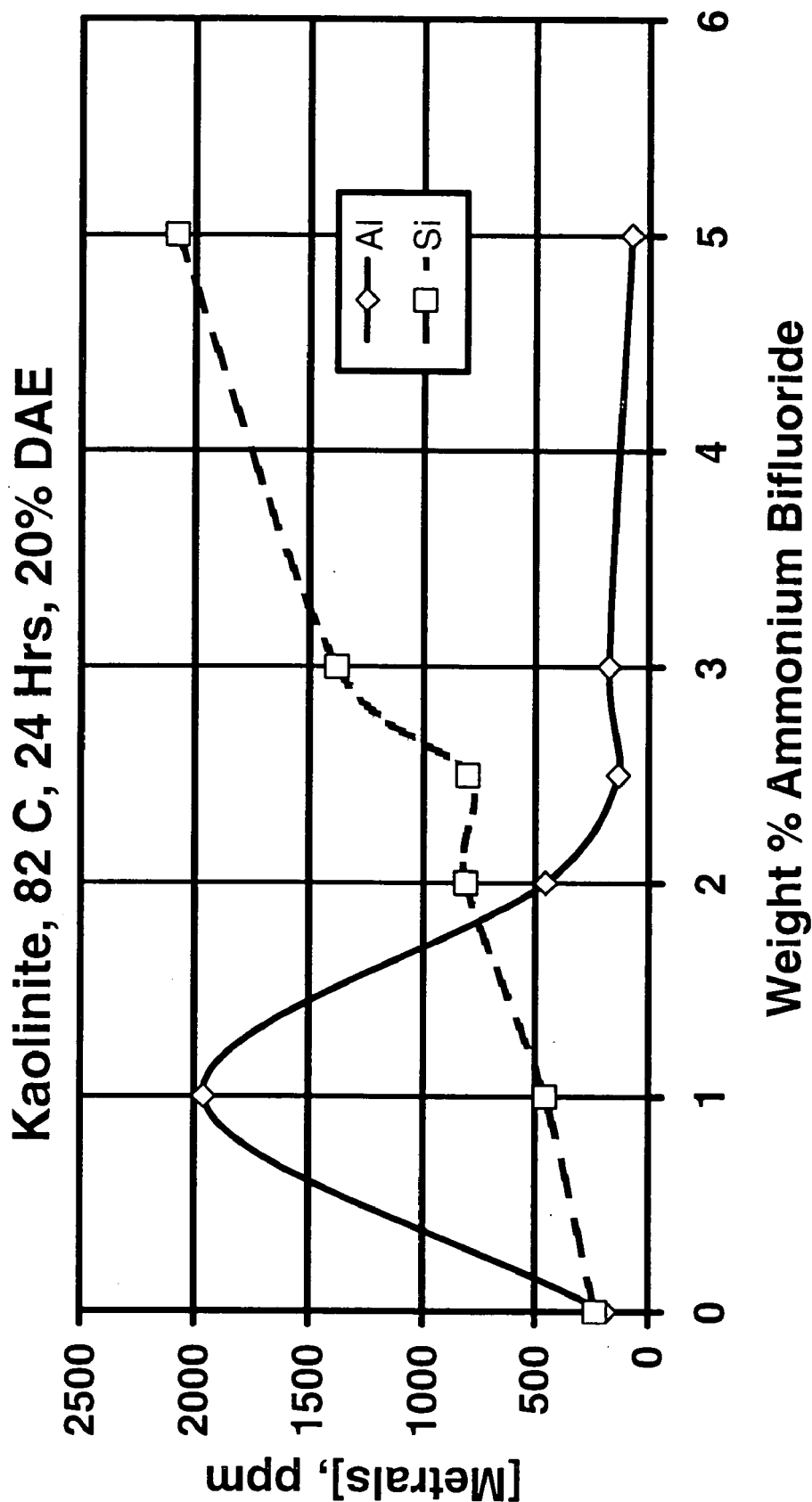
FIG. 2 shows the aluminum and silicon in solution after treatment of kaolinite with DAE and varying amounts of ammonium bifluoride for 24 hours at 176° F. (80° C.).
Figure 3:
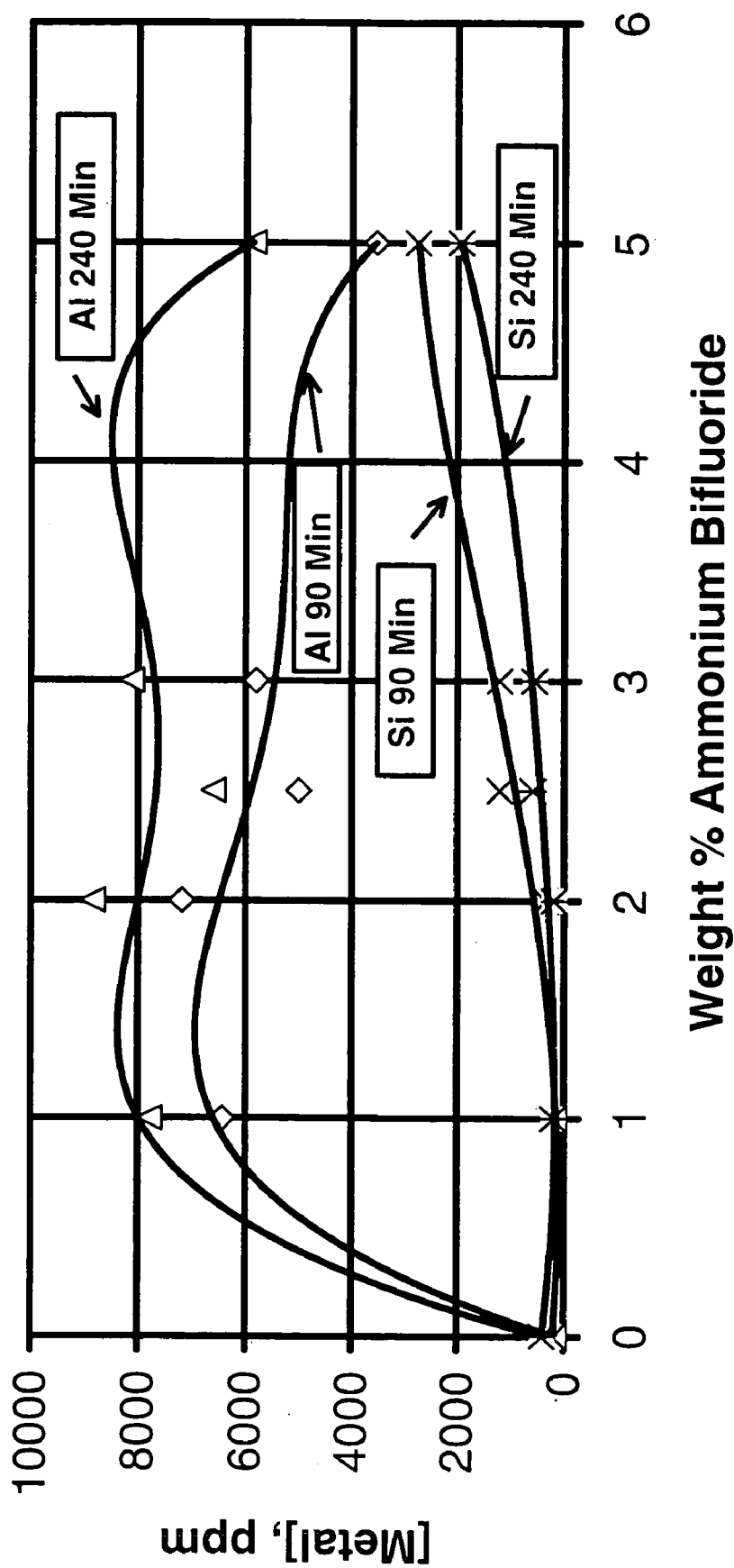
FIG. 3 shows the aluminum and silicon in solution after treatment of kaolinite with DAE and varying amounts of ammonium bifluoride for 90 and 240 minutes at 212° F. (100° C.).

FIG. 1 shows the ppm aluminum and silicon in solution after treatment of kaolinite (using 100 ml of treatment fluid and 2 g clay in static tests) with 50 weight percent as-received (20 weight percent active) trisodium HEDTA at 176° F. (80° C.) for 24 hours and varying amounts of ammonium bifluoride from 0 to 5 weight percent. FIG. 2 shows the ppm aluminum and silicon in solution after treatment of kaolinite (using 100 ml of treatment fluid and 2 g clay in static tests) with 50 weight percent as-received (20 weight percent active) DAE at 176° F. (80° C.) for 24 hours and varying amounts of ammonium bifluoride from 0 to 5 weight percent. FIG. 3 shows the ppm aluminum and silicon in solution after treatment of kaolinite (in the slurry reactor with a weight ratio of fluid to clay of 9:1, sampled at 90 and 240 minutes) with 50 weight percent as-received (20 weight percent active) DAE at 212° F. (100° C.) and varying amounts of ammonium bifluoride from 0 to 5 weight percent.

EXAMPLE 1

Certain chelating agents such as trisodium hydroxyethylethylenediamine triacetate (which we will refer to as "HEDTA" in these examples) and disodium diammonium ethylenediaminetetraacetate (which we will refer to as "DAE" in these examples) are more effective for increasing the permeability of short (six inch) Berea sandstone cores at temperatures above about 250° F. (121° C.) than any conventional fluids containing HF (generated from ammonium bifluoride precursor) that were tested. On the other hand, mineral dissolution tests in the slurry reactor showed that these chelating agents did not dissolve much of any of the minerals tested. With kaolinite, after 4 hours at 212° F. (100° C.) in 50 percent HEDTA the concentration of aluminum is about 80 ppm and the concentration of silicon is about 60 ppm; after 4 hours at 302° F. (150° C.) the concentration of aluminum is about 1100 ppm and the concentration of silicon is about 450 ppm. However, after 4 hours in 9:1 mud acid, at only 149° F. (65° C.), the concentration of aluminum is about 10,000 ppm and the concentration of silicon is about 100 ppm. (The solubility limit for silicon is about 500 ppm at that temperature.) The HEDTA can keep silicon in solution, but its total dissolving capacity is very low. On the other hand, after 4 hours at 212° F. (100° C.) in 50 percent DAE the concentration of aluminum is about 450 ppm and the concentration of silicon is about 350 ppm; after 4 hours at 302° F. (150° C.) the concentration of aluminum is about 2200 ppm and the concentration of silicon is about 475 ppm. The DAE is much more reactive than the HEDTA, even though the pH of the DAE solution is about 4.5, vs. about 4 for the HEDTA. Not to be limited by theory, but it is believed that the increased reactivity of the DAE may be due to the protons provided by the ammonium ions. Similarly, other data not given here show that DAE removes more magnesium and aluminum from chlorite and more aluminum from illite than does HEDTA and each dissolves silicon up to its solubility limit; neither dissolves much analcime or albite.

The core flood data in Table 2 show that HEDTA and DAE (rows 1 and 5) produce dramatic increases in the Berea permeability while removing very little silicon or aluminum but a lot of calcium (especially the DAE). In comparison, mud acid, or even 15% HCl, (rows 14 and 15) remove much more aluminum, and comparable amounts of calcium and silicon as the chelants, but give much smaller increases in permeability. They show the highest peak silicon, especially the mud acid, but cannot keep it in solution. Interestingly, the tetraamonium EDTA and tetrasodium EDTA (rows 9, 10 and 12) were not as effective as either HEDTA or DAE, but were still better than the mineral acids. Because of the relatively low solubility of tetrasodium EDTA, it was used at either half strength or with the pH adjusted to 6 with HCl (where it is more soluble). Note that addition of DPM mutual solvent and a surfactant increased the permeability enhancement for both HEDTA and DAE (rows 3 and 7).

These results show that certain chelating agents, especially DAE, most especially with added mutual solvent and surfactant, can be very effective in increasing the permeability of Berea sandstone. However, they are not very effective in removing silica or aluminosilicates. If damage is to be removed, which is the usual reason for stimulating sandstones, then improvement of their performance can be beneficial.

EXAMPLE 2

Addition of ammonium bifluoride to fluids containing the chelating agents greatly increases the amount of aluminum removed from kaolinite and Berea sandstone, but does not improve the stimulation of the Berea sandstone. Compare, for example, rows 23 and 24 in Table 1 for HEDTA, and rows 10 and 11 for DAE, that show greatly increased dissolution of aluminum from kaolinite with the addition of 1 weight percent ammonium bifluoride (especially for DAE, especially when the temperatures are considered) with little change in silicon. However, rows 1 and 2 of Table 2 for HEDTA, and rows 5 and 6 for DAE, show that the ammonium bifluoride significantly decreased the permeability improvement for HEDTA, and had little effect on the permeability improvement for DAE. These results show that the permeability of a sandstone damaged by the presence of kaolinite in the pores would be improved by the proper chelant/ammonium bifluoride combination. However, note from rows 12 and 13 of Table 2 that ammonium bifluoride does not improve the performance of $Na_4EDTA$; the ammonium ion helps. Furthermore, it can be seen from the data in Table 2, that addition of ammonium bifluoride lowered the permeability improvement (although there was still always an improvement) in every case except when the chelant was DAE and a mutual solvent and surfactant were included (row 8). It is not shown here, but in most of these cases there was substantially more dissolved silicon in the KCl flush used to establish the final permeability after the treatment step when ammonium bifluoride was included in the treatment than when it was not. Not to be limited by theory, but it is believed that this indicates mobilization of initially-dissolved silicon from initially-dissolved aluminosilicates because of the high values of dissolved aluminum. It is also believed that the permeability increase when mutual solvent and surfactant were included was due to removal or stabilization of fines initially present, or precipitated, or both. Even with ammonium bifluoride there is re-precipitation of initially-dissolved silicon, but with DAE there is less (compared with mineral acids) and with DPM and surfactant it is less harmful. Not to be limited by theory, but we believe that the surfactants/mutual solvents keep any re-precipitated silicon dispersed.

EXAMPLE 3

Since the Berea sandstone used consisted of a number of minerals but was undamaged, dissolution of the Berea sandstone was not a good experiment to evaluate the ability of various treatment fluids to dissolve specific minerals that might cause damage in hydrocarbon-producing formations. Therefore, to determine the effect of varying the treatment fluid composition, kaolinite dissolution experiments were performed. FIG. 1 shows the ppm aluminum and silicon in solution after treatment of kaolinite (using 100 ml of treatment fluid and 2 g clay in static tests) with 50 weight percent as-received (20 weight percent active) HEDTA at 176° F. (80° C.) for 24 hours and varying amounts of ammonium bifluoride from 0 to 5 weight percent. There does not appear to be any benefit in adding ammonium bifluoride to trisodium HEDTA at this temperature, probably because of the low solubility of NaF ("HEDTA" is actually trisodium HEDTA and contains over 5 percent sodium). However, rows 23 and 24 of Table 1 show that addition of ammonium bifluoride to HEDTA at about 145–150° C. (about 293 302° F.) does increase the aluminum in solution, although it does not increase the silicon in solution.

The experiments shown in rows 1 through 4 show how the pH affects behavior with citric acid as the chelant and a relatively large amount of ammonium bifluoride. At a pH of about 4.7 to 4.8, silicon is held in solution but aluminum precipitates; when HCl is added to lower the pH, aluminum is held in solution but silicon precipitates. Although it is not shown, the boric acid in the experiments of rows 3 and 4 also slowed down the reactions; the maximum silicon and aluminum concentrations in the supernatant were reached after about 30 minutes in the experiment of row 1; in the experiment of row 3 the maximum aluminum concentration was reached after about 50 minutes and the maximum silicon concentration after about 150 minutes. (Also not shown, is that the boric acid slowed the reaction of DAE in the experiment of row 8 about the same way it slowed the reaction of citric acid in the experiment of row 3.) Row 5 shows that approximately the same amount of DAE as citric acid is not effective, but row 6 shows that with more DAE, not only is the fluid effective, but most importantly, it holds both silicon and aluminum in solution. These experiments show a very important result. When about 12 percent active DAE was present at 149° F. (65° C.), very little aluminum was in solution, but the theoretical amount of silicon (based on 6:1 fluoride:silicon) was dissolved. The precipitate was identified by powder XRD as aluminum fluoride. However, when about 20 percent active DAE was present at 149° F. (65° C.), more aluminum was found in solution and less silicon. It is believed that this is because the aluminum was partially present as an aluminum-EDTA-fluoride complex. Not shown is that the silicon concentration was almost constant in the experiment of row 6 after about 15 minutes, whereas the aluminum concentration was very low for the first hour and was still rising after 4 hours.

EXAMPLE 4

The effect of the ammonium bifluoride concentration on the dissolution of kaolinite with DAE was investigated. FIG. 2 shows the ppm aluminum and silicon in solution after treatment of kaolinite (using 100 ml of treatment fluid and 2 g clay in static tests) with 50 weight percent as-received (20 weight percent active) DAE at 176° F. (80° C.) for 24 hours and varying amounts of ammonium bifluoride from 0 to 5 weight percent. In this specific case, the highest concentration of aluminum in the supernatant occurred at an ammonium bifluoride concentration of about 1 percent, while the highest concentration of silicon occurred at least 5 percent ammonium bifluoride. The silicon and aluminum concentrations were about equal at about 2 percent ammonium bifluoride.

FIG. 3 shows the ppm aluminum and silicon in solution after treatment of kaolinite (in the slurry reactor with a weight ratio of fluid to clay of 9:1, sampled at 90 and 240 minutes) with 50 weight percent as-received (20 weight percent active) DAE at 212° F. (100° C.) and varying amounts of ammonium bifluoride from 0 to 5 weight percent (the experiments in rows 10–15 in Table 1). The maximum solubility of silicon in water is about 500 ppm at 302° F. (150° C.); it is probable that up to about 2 percent ammonium bifluoride in these experiments at 302° F. (150° C.) the maximum was all that was seen. Not to be limited by theory, but it appears that below that there was only enough ammonium bifluoride to provide enough fluoride to form the aluminum-EDTA-fluoride complex and essentially only additional aluminum was dissolved. With increasing fluoride, however, more silicon stayed in solution for longer times, and less aluminum dissolved (or stayed in solution). It should be noted that at higher concentrations of ammonium bifluoride, such as 5 percent, EDTA acid precipitates out of a solution of DAE and ammonium bifluoride after about one half to one hour at ambient temperature. This can be prevented by raising the pH of the initial solution, for example to about 6.5 with ammonia. Row 16 in Table 1 shows that this greatly increases the solubility of aluminum and decreases the solubility of silicon; row 9 of Table 1 shows that increasing the pH further to 8.9 decreases the solubility of aluminum but increases the solubility of silicon. This further shows how embodiments of the invention can be manipulated by adjusting the initial pH and ammonium ion content, in this case at constant total fluorine content. Note that, according to the equilibrium shown above in equation (5), raising the pH by adding ammonium will lower the amount of HF generated; at a pH above about 6, the amount of HF available is quite low at temperatures below about 212° F. (100° C.).

In another experiment, row 18 of Table 1, kaolinite dissolution in 20 percent active DAE with 1 percent ammonium bifluoride at 302° F. (150° C.) resulted in almost 10,000 ppm aluminum in solution but no more than about 500 ppm silicon. Again it is believed that an aluminum-EDTA-fluoride complex was forming and no fluoride was available to increase the dissolution of silicon. Over this range of initial and final pH"s, $Al(OH)_3$ would precipitate if EDTA were not present. In another experiment, not shown, with 20 percent active DAE and 5 percent ammonium bifluoride at 248° F. (120° C.) for 4 hours, powder XRD of the recovered solids showed the major crystalline phase to be ammonium aluminum fluoride, with very little kaolinite. Amorphous silica should have been present but would not have been detected by powder XRD. These results are consistent with reactions 6–8 shown above.

EXAMPLE 5

The dissolution of other minerals was examined in 20 percent active DAE and 5 percent ammonium bifluoride at 212° F. (100° C.) for 4 hours. The ppm metal in the supernatant at the end of each test is shown below, with kaolinite for comparison:

|  | Al | Si | Na | Mg | Ca | K |
| --- | --- | --- | --- | --- | --- | --- |
| Analcime | 192 | 3410 | 200 |  |  |  |
| Chlorite | 100 | 1680 |  | 150 |  |  |
| Kaolinite | 5860 | 1940 |  |  |  |  |
| Illite | 1100 | 3600 |  |  |  | 750 |
| Albite | 100 | 3350 | tr |  |  |  |
| Montmorillonite | 950 | 2500 |  |  | 400 |  |

It can be seen that for the other minerals tested, the DAE/ammonium bifluoride fluid very effectively dissolved and kept in solution more silicon than aluminum. In another set of reactions (not shown) when the pH of the fluid was raised from about 5 to about 6.5 with ammonium ion, the dissolution of each of the other minerals was about the same. After these experiments, powder XRD analyses showed that the residues from kaolinite and illite contained $(NH_4)_3AlF_6$, the residue from chlorite contained $NH_4MgAlF_6$, and the residue from analcime contained $(NH_4)_2SiF_6$. For further comparison, at 212° F. (100° C.) for 4 hours, 9:1 mud acid, that has a much lower pH, dissolves more aluminum and less silicon from each of these minerals than does the 20 percent active DAE 5 percent ammonium bifluoride fluid at pH 5.

EXAMPLE 6

A serious problem with mud acid is that when it contacts calcium ions, $CaF_2$ is precipitated. Consequently, preflushes, spacers and other techniques must be used to prevent this from occurring whenever there is any carbonate in sandstone being treated, which is very often the case. Dissolution experiments were run with 71 percent kaolinite and 29 percent $CaCO_3$ at 257° F. (125° C.) for 4 hours; this is a two to three times higher $CaCO_3$ concentration than would normally be found in sandstones. With 20 percent active DAE and 1 percent ammonium bifluoride, almost 1 percent Ca was maintained in solution, the dissolution of the kaolinite was similar to tests with pure kaolinite, and powder XRD showed no $CaF_2$ in the solids. When the concentration of ammonium bifluoride was increased to 2.5 percent, the kaolinite still dissolved, and there was still almost 0.5 percent Ca in solution, but $CaF_2$ could be seen in the residue and there was no silicon in solution. It is clear that sandstone matrix stimulation fluids that are tolerant of Ca but still dissolve minerals can be formulated.

Core flood tests were run with Berea cores and DAE at pH 6.5 with 2, 3 and 5 weight percent ammonium bifluoride (and with 2 weight percent ammonium fluoride and either 2 weight percent boric acid or 0.5 weight percent scale inhibitor) at 95, 123, and 149° C. (203, 253, and 300° F.). The results are shown in Table 3. (It should be kept in mind that the Berea cores were undamaged; a treatment capable of increasing the permeability of a damaged formation by removing certain materials might decrease the permeability of a clean Berea core.) For each composition, with increasing temperature the amount of aluminum removed and in solution increased and the amount of silicon removed and in solution decreased. The amount of calcium removed and in solution was substantial in all cases. With 5 percent ammonium bifluoride, the core permeabilities were decreased at each temperature; with 3 percent ammonium bifluoride, permeability was increased at the lower two temperatures but slightly decreased at the highest temperature. With 2 percent ammonium bifluoride the permeabilities were closer to unchanged than with other compositions. With 2 percent ammonium bifluoride and 2 percent boric acid, the permeabilities were all increased, sometimes substantially, and the amounts of aluminum and silicon removed and in solution were decreased. The scale inhibitors increased or decreased the amounts of aluminum or silicon removed and in solution modestly, but decreased the amount of calcium substantially. In one case, injection of a pre-flush of 20 weight percent active DAE without ammonium bifluoride increased the amounts of aluminum, silicon and calcium removed and in solution but did not affect the change in permeability.

Although the methods have been described here for, and are most typically used for, hydrocarbon production, they may also be used in injection wells and for production of other fluids, such as water or brine.

TABLE 1

Kaolinite Dissolution Tests in Slurry Reactor

| | Fluid | HCl | ABF | Chelant | Boric Acid | Initial pH | Final pH | Deg C. | Final ppm Al | Final ppm Si | % Al diss. | % Si diss. |
|---|---|---|---|---|---|---|---|---|---|---|---|---|
| 1 | Citric | | 5 | 13 | | 4.7 | 3.3 | 65 | 1160 | 8720 | 4.7 | 34.4 |
| 2 | Citric | 4 | 5 | 13 | | 2.8 | 0.6 | 65 | 13300 | 1900 | 54.3 | 7.5 |
| 3 | CSA | | 5 | 13 | 2.5 | 4.78 | 4 | 65 | 1350 | 5160 | 5.5 | 20.4 |
| 4 | CSA | 11 | 5 | 13 | 2.5 | 1 | 1 | 100 | 11000 | 215 | 46.0 | 1.0 |
| 5 | DAE | | 5 | 12 | | | | 65 | 100 | 6800 | | |
| 6 | DAE | | 5 | 20 | | | | 65 | 2000 | 3250 | | |
| 7 | DAE | | 5 | 20 | | 5.52 | 6 | 65 | 126 | 6820 | 0.5 | 26.9 |
| 8 | DAE | | 5 | 12 | 2.5 | 5.9 | 6 | 65 | 672 | 1700 | 2.7 | 6.7 |
| 9 | DAE + $NH_3$ | | 5 | 20 | | 8.9 | 9.5 | 100 | 336 | 1570 | 1.4 | 6.2 |
| 10 | DAE | | | 20 | | 4.5 | 5 | 100 | 438 | 361 | 1.8 | 1.4 |
| 11 | DAE | 1 | | 20 | | 5 | 7 | 100 | 7790 | 202 | 31.8 | 0.8 |
| 12 | DAE | 2 | | 20 | | 5.5 | | 100 | 8840 | 200 | 36.1 | 0.8 |
| 13 | DAE | 2.5 | | 20 | | | | 100 | 6600 | 583 | 26.9 | 2.3 |
| 14 | DAE | 3 | | 20 | | | | 100 | 8120 | 556 | 33.1 | 2.2 |
| 15 | DAE | 5 | | 20 | | | | 100 | 5860 | 1940 | 23.0 | 9.0 |
| 16 | DAE | 5 | | 20 | | 6.5 | | 100 | 12000 | 100 | 50.0 | 0.4 |
| 17 | DAE | | | 20 | | 4.6 | 5.5 | 150 | 2260 | 460 | 9.2 | 1.8 |
| 18 | DAE | 1 | | 20 | | 6.2 | 8.9 | 150 | 9360 | 400 | 38.2 | 1.6 |
| 19 | DAE | | | 20 | | | | 150 | 8850 | 392 | 36.0 | 1.6 |
| 20 | HEDTA | | | 20 | | 3.9 | 2.06 | 100 | 77 | 55 | 0.3 | 0.2 |
| 21 | HEDTA | | | 20 | | 3.9 | 2 | 130 | 609 | 415 | 2.5 | 1.6 |
| 22 | HEDTA | | | 20 | | 3.9 | 4.6 | 150 | 1100 | 450 | 4.5 | 1.8 |
| 23 | HEDTA | | | 20 | | 3.9 | 2.06 | 162 | 3220 | 460 | 13.1 | 1.8 |
| 24 | HEDTA | | 1 | 20 | | 4.2 | 6.5 | 145 | 7940 | 470 | 32.4 | 1.9 |

TABLE 2

Berea Sandstone Core Flood Tests, 177° C.

| | (% Active) Fluid | Initial Perm., k | Final Perm., k | % Perm. Increase | Peak Al, ppm | Total Al, mg | Peak Ca, ppm | Total Ca, mg | Peak Si, ppm | Total Si, mg | Weight Loss, g |
|---|---|---|---|---|---|---|---|---|---|---|---|
| 1 | 20% HEDTA, pH 4 | 42 | 53 | 26 | 527 | 123 | 2960 | 202 | 503 | 124 | 3.3 |
| 2 | 20% HEDTA/1% ABF | 15 | 15.7 | 5 | 1130 | 128 | 4370 | 276 | 475 | 113 | 5 |
| 3 | 20% HEDTA/10% DPM/ 0.5% SURF | 14.9 | 20.6 | 38 | 466 | 72 | 5580 | 289 | 560 | 75 | 7.2 |
| 4 | 20% HEDTA/10% DPM/ 0.5% SURF/1% ABF | 17.2 | 18.5 | 8 | 1020 | 112 | 4080 | 358 | 571 | 92 | 4.1 |
| 5 | 20% DAE | 16.7 | 21.6 | 29 | 867 | 101 | 8290 | 360 | 548 | 72 | 5.2 |
| 6 | 20% DAE/1% ABF | 17.5 | 22.3 | 27 | 8710 | 899 | 3950 | 340 | 513 | 80 | 8.7 |
| 7 | 20% DAE/10% DPM/ 0.5% SURF | 18 | 23.9 | 33 | 950 | 129 | 9280 | 400 | 527 | 91 | 4 |
| 8 | 20% DAE/10% DPM/ | 16.7 | 23.05 | 38 | 7780 | 785 | 9280 | 407 | 436 | 34 | 6 |

TABLE 2-continued

Berea Sandstone Core Flood Tests, 177° C.

| (% Active) Fluid | Initial Perm., k | Final Perm., k | % Perm. Increase | Peak Al, ppm | Total Al, mg | Peak Ca, ppm | Total Ca, mg | Peak Si, ppm | Total Si, mg | Weight Loss, g |
|---|---|---|---|---|---|---|---|---|---|---|
| 0.5% SURF/1% ABF | | | | | | | | | | |
| 9  20% $(NH_4)_4$ EDTA | 14.6 | 17.2 | 18 | 550 | 63 | 7930 | 328 | 439 | 29 | 4.2 |
| 10  20% $NA_4$EDTA | 21.4 | 23 | 8 | 204 | 22 | 4000 | 168 | 200 | 23 | 3.4 |
| 11  5% $Na_4$EDTA | 20.6 | 20.9 | 2 | | 22 | | 124 | | 8 | |
| 12  20% $Na_4$EDTA/HCl, pH 6 | 14.4 | 15.3 | 6 | 480 | 49 | 5700 | 266 | 380 | 44 | 8.5 |
| 13  20% $Na_4$EDTA/HCl/ 1% ABF, pH 6 | 23.9 | 25.4 | 6 | 1060 | 104 | 4500 | 278 | 335 | 76 | 6 |
| 14  9% 9/1 Mud Acid (HCl/HF) | 24.5 | 27 | 10 | 5430 | 640 | 5890 | 220 | 1340 | 167 | 11.6 |
| 15  15% HCl | 20.6 | 21.7 | 5 | 11100 | 1087 | 8000 | 284 | 634 | 59 | 9.4 |

TABLE 3

Berea Sandstone Core Flood Tests, 20 Weight % Active DAE

| | Added Component | pH | Deg C. | % ABF | Peak Al, ppm | Total Al, mg | Peak Ca, ppm | Total Ca, mg | Peak Si, ppm | Total Si, mg | F/I Perm |
|---|---|---|---|---|---|---|---|---|---|---|---|
| 1 | | 6.5 | 95 | 5 | 345 | 36 | 3100 | 363 | 3480 | 369 | 0.85 |
| 2 | | 6.5 | 123 | 5 | 900 | 51 | 3600 | 255 | 2200 | 107 | 0.46 |
| 3 | | 6.5 | 149 | 5 | 3100 | 223 | 3800 | 253 | 600 | 58 | 0.05 |
| 4 | Pre Stage of DAE | 6.5 | 149 | 5 | 6300 | 445 | 8700 | 467 | 1750 | 101 | 0.04 |
| 5 | | 6.5 | 95 | 3 | 517 | 89 | 2550 | 357 | 1970 | 237 | 1.26 |
| 6 | | 6.5 | 123 | 3 | 1660 | 118 | 3600 | 280 | 400 | 50 | 1.40 |
| 7 | | 6.5 | 149 | 3 | 3720 | 416 | 4580 | 400 | 389 | 72 | 0.87 |
| 8 | | 6.5 | 95 | 2 | 836 | 115 | 3800 | 461 | 1630 | 178 | 1.23 |
| 9 | | 6.5 | 123 | 2 | 2500 | 190 | 4710 | 529 | 1050 | 106 | 0.91 |
| 10 | | 6.5 | 149 | 2 | 4350 | 577 | 6240 | 515 | 536 | 88 | 0.99 |
| 11 | 2% Boric Acid | 6.5 | 95 | 2 | 496 | 58 | 3900 | 472 | 901 | 106 | 1.60 |
| 12 | 2% Boric Acid | 6.5 | 123 | 2 | 1300 | 110 | 2200 | 187 | 600 | 85 | 1.08 |
| 13 | 2% Boric Acid | 6.5 | 149 | 2 | 3230 | 278 | 6240 | 530 | 500 | 85 | 1.60 |
| 14 | 0.5% Scale Inhibitor A | 6.5 | 95 | 2 | 903 | 117 | 1000 | 134 | 2200 | 257 | 1.07 |
| 15 | 0.5% Scale Inhibitor A | 6.5 | 123 | 2 | 2570 | 228 | 1840 | 232 | 1660 | 185 | 0.60 (Plug) |
| 16 | 0.5% Scale Inhibitor B | 6.5 | 123 | 2 | 1150 | 134 | 2000 | 205 | 1700 | 206 | 0.70 |
| 17 | 0.5% Scale Inhibitor B | 6.5 | 149 | 2 | 3750 | 432 | 2640 | 235 | 950 | 128 | 0.35 |

What is claimed is:

1. An aqueous oilfield treatment fluid, having a pH between about 3 and about 7, the fluid comprising dissolved ammonium bifluoride in an amount of from about 0.5 to about 6 weight percent, boric acid in an amount of between about 1 weight percent and about 6 weight percent, preferably between about 2 weight percent and about 4 weight percent, and most preferably between about 2.5 weight percent and about 3.5 weight percent, and from about 12 to about 40 weight percent of a dissolved chelating acid, wherein the log of the first stability constant of the chelating acid with aluminum ion is greater than about 5.

2. The aqueous oilfield treatment fluid of claim 1 wherein the chelating acid is selected from the group consisting of maleic acid, tartaric acid, citric acid, nitrilotriacetic acid, hydroxyethyliminodiacetic acid, hydroxyethylethylenediaminetetraacetic acid, ethylenediaminetetraacetic acid, cyclohexylenediaminetetraacetic acid, diethylenetriaminepentaacetic acid, ammonium salts thereof, lithium salts thereof, sodium salts thereof, and mixtures thereof.

3. The aqueous oilfield treatment fluid of claim 2 wherein the chelating acid is diammonium ethylenediaminetetraacetic acid.

4. The aqueous oilfield treatment fluid of claim 3 wherein the diammonium ethylenediaminetetraacetic acid is present in an amount between about 17 and about 30 weight percent, preferably between about 20 and about 25 weight percent.

5. The aqueous oilfield treatment fluid of claim 1 wherein the pH is adjusted to between about 5 and about 7, preferably between about 5 and about 6.5.

6. The aqueous oilfield treatment fluid of claim 5 wherein the pH is adjusted with a base selected from the group consisting of an ammonium salt, ammonium hydroxide, and an amine of the formula R1R2R3N wherein R1, R2, and R3 are selected from the group consisting of alkyl groups having from one to about 4 carbon atoms, $CH_2CH_2OH$, and H.

7. The aqueous oilfield treatment fluid of claim 5 wherein the pH is adjusted with an acid selected from the group consisting of HCl, formic acid, and acetic acid.

8. The aqueous oilfield treatment fluid of claim 1 wherein the ammonium bifluoride is present in an amount between about 0.5 and about 6 weight percent, preferably between about 1 and about 5 weight percent, most preferably between about 1 and about 2 weight percent.

9. The aqueous oilfield treatment fluid of claim 1 further comprising a mutual solvent.

10. The aqueous oilfield treatment fluid of claim 1 further comprising a surfactant.

* * * * *